US009817969B2

(12) United States Patent
Lee et al.

(10) Patent No.: US 9,817,969 B2
(45) Date of Patent: Nov. 14, 2017

(54) DEVICE FOR DETECTING CYBER ATTACK BASED ON EVENT ANALYSIS AND METHOD THEREOF

(71) Applicant: PENTA SECURITY SYSTEMS INC., Seoul (KR)

(72) Inventors: Seok Woo Lee, Seoul (KR); Sang Gyoo Sim, Seoul (KR); Duk Soo Kim, Seoul (KR)

(73) Assignee: PENTA SECURITY SYSTEMS INC., Seoul (KR)

(*) Notice: Subject to any disclaimer, the term of this patent is extended or adjusted under 35 U.S.C. 154(b) by 0 days.

(21) Appl. No.: 14/514,516

(22) Filed: Oct. 15, 2014

(65) Prior Publication Data
US 2015/0106933 A1 Apr. 16, 2015

(30) Foreign Application Priority Data
Oct. 15, 2013 (KR) .................. 10-2013-0122343

(51) Int. Cl.
*G06F 21/55* (2013.01)
*H04L 29/06* (2006.01)

(52) U.S. Cl.
CPC ........ *G06F 21/554* (2013.01); *H04L 63/1416* (2013.01); *H04L 63/1425* (2013.01); *H04L 63/1433* (2013.01)

(58) Field of Classification Search
CPC ............. H04L 63/1425; H04L 63/1433; H04L 63/1416; G06F 21/554
(Continued)

(56) References Cited

U.S. PATENT DOCUMENTS 8,205,258 B1 * 6/2012 Chang ............... G06F 17/30684
709/217
8,521,667 B2 * 8/2013 Zhu ........................ G06F 21/56
706/13
(Continued)

FOREIGN PATENT DOCUMENTS

JP 2012-527691 A 11/2012
KR 1020080072770 A 8/2008
(Continued)

OTHER PUBLICATIONS

Grouping Web page references into transactions for mining World Wide Web browsing patterns, Cooley et al, IEEE 1997, 10.1109/KDEX.1997.629824.*
(Continued)

*Primary Examiner* — Luu Pham
*Assistant Examiner* — Jahangir Kabir
(74) *Attorney, Agent, or Firm* — Ladas & Parry LLP

(57) ABSTRACT

There are provided a device for detecting a cyber attack and a method thereof. The device for detecting a cyber attack includes an event receiving unit configured to receive an event generated in at least one user terminal according to a behavior of a user who accesses a web server and uses web services provided from a web page, a model generating unit configured to generate an event model by extracting an event pattern corresponding to a behavior of the user based on the received event, and an attack detecting unit configured to detect whether access of the web server by a specific user terminal is an attack by comparing the event model with an event received from the specific user terminal. Therefore, various forms of cyber attacks are rapidly and accurately detected, and it is possible to provide a security service having high availability and reliability.

4 Claims, 5 Drawing Sheets

(58) Field of Classification Search
USPC .................................................. 726/22–25
See application file for complete search history.

(56) References Cited

U.S. PATENT DOCUMENTS

| | | | | |
|---|---|---|---|---|
| 8,838,992 | B1* | 9/2014 | Zhu | G06F 21/56 |
| | | | | 713/164 |
| 8,949,990 | B1* | 2/2015 | Hsieh | G06F 21/577 |
| | | | | 726/22 |
| 9,215,248 | B1* | 12/2015 | Bergman | H04L 63/1458 |
| 2004/0098617 | A1 | 5/2004 | Sekar | |
| 2010/0180336 | A1* | 7/2010 | Jones | H04L 9/3226 |
| | | | | 726/19 |
| 2010/0299292 | A1* | 11/2010 | Collazo | G06F 21/577 |
| | | | | 706/14 |
| 2011/0055925 | A1* | 3/2011 | Jakobsson | G06F 21/552 |
| | | | | 726/25 |
| 2011/0185421 | A1 | 7/2011 | Wittenstein et al. | |
| 2012/0096553 | A1 | 4/2012 | Srivastava et al. | |
| 2013/0174257 | A1* | 7/2013 | Zhou | H04L 63/1416 |
| | | | | 726/23 |
| 2016/0088015 | A1* | 3/2016 | Sivan | H04L 29/06 |
| | | | | 726/23 |

FOREIGN PATENT DOCUMENTS

| | | |
|---|---|---|
| KR | 1020110011935 A | 2/2011 |
| KR | 1020110068308 A | 6/2011 |
| KR | 1020130085570 A | 7/2013 |
| WO | 2010/135068 A1 | 11/2010 |

OTHER PUBLICATIONS

ETree: Effective and Efficient Event Modeling for Real-Time Online Social Media Networks, Gu et al, IEEE 2011, 10.1109/WI-IAT.2011.126.*

Prediction of User's Web-Browsing Behavior: Application of Markov Model, Awad et al, IEEE 2012, 10.1109/TSMCB.2012.2187441.*

Akira Yamada, et al; "Intrusion Detection for Encrypted Web Traffic", The Institute of Electronics Information and Communication Engineers IEICE Technical Report; Oct. 20, 2015; 14 pages.

* cited by examiner

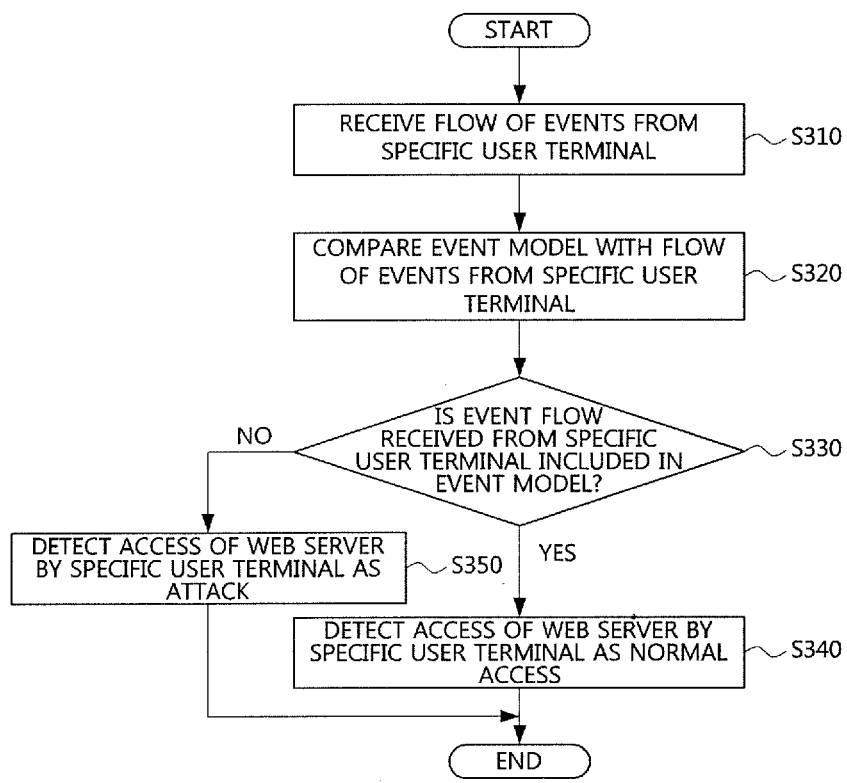

DEVICE FOR DETECTING CYBER ATTACK BASED ON EVENT ANALYSIS AND METHOD THEREOF

CLAIM FOR PRIORITY

This application claims priority to Korean Patent Application No. 10-2013-0122343 filed on Oct. 15, 2013 in the Korean Intellectual Property Office (KIPO), the entire contents of which are hereby incorporated by reference.

BACKGROUND

1. Technical Field

Example embodiments of the present invention relate to cyber security technology, and more specifically, to a device for detecting a cyber attack by analyzing an event generated in a user terminal according to a behavior of a user who uses a web service, and a method thereof.

2. Related Art

With the development of network technology, users can freely use various services such as reservations, banking, product order, and payment on the Internet using various information and communication devices. However, as an influence of the Internet increases in the modern society, damage caused by cyber attacks is increasing.

The recent cyber attack that intruded computer systems of Nonghyup and caused computer problems is an advanced persistent threat (APT) attack. The attack uses a new cyber attack method in which social engineering techniques stimulating curiosity about attack targets are used to infect systems of attack targets with malicious codes, and access rights gradually increase to cause security problems.

In general, the APT attack aims main information facilities of the government or companies, and attempts to steal information that should be secured such as industrial secrets, military secrets, and customer information.

In this way, recent cyber attacks have been performed by organized hacker groups who hack specific targets precisely and deliberately, hijack information of companies, invade control systems, and threaten national security.

In order to respond to gradually intellectualized cyber attacks of this type, the government and companies apply attack detecting technology and intrusion detecting technology for detecting cyber attacks from hackers and blocking access detected as an attack to systems in order to improve security.

For example, as security technology for blocking access upon unauthorized intrusion, a firewall is positioned among networks and physically separates networks. However, a flow of network traffic is blocked in order to detect cyber attacks, which may decrease a traffic speed, and it is difficult to detect an attack from hackers who use an Internet protocol (IP) from which access is allowed.

Also, security technology for detecting cyber threats in advance based on vulnerability information of systems and network traffic analysis information can respond to predictable cyber attacks through security policy setting, but it is open to unpredictable attacks.

In particular, cyber attacks performed by a plurality of systems infected with malicious codes, that is, zombie PCs, are difficult to be recognized in advance. Therefore, technology for detecting an attack upon abnormal access that is disguised as a normal event by a user for whom access is allowed is necessary.

SUMMARY

Example embodiments of the present invention provide a device for detecting a cyber attack that can rapidly and accurately detect various forms of cyber attacks by monitoring and analyzing events generated in a user terminal in real time.

Example embodiments of the present invention also provide a method of detecting a cyber attack that minimizes a load and time of systems that may be generated during detecting cyber attacks, does not influence a speed of web services provided for a user, and can provide a security service having high availability and reliability.

In some example embodiments, a device for detecting a cyber attack is implemented in an information and communication system in which a web server managing a web page and at least one user terminal operated by at least one user who uses the web page are connected via a network. The device includes an event receiving unit configured to receive an event generated in the at least one user terminal according to a behavior of at least one user who accesses the web server and uses web services provided from the web page; a model generating unit configured to generate an event model by extracting an event pattern corresponding to a behavior of at least one user who uses the web services based on the received event; and an attack detecting unit configured to detect whether access of the web server by a specific user terminal is an attack by comparing the generated event model with an event received from the specific user terminal.

The model generating unit may include a pattern extracting module configured to extract at least one event pattern by combining sequences of events received in the event receiving unit along a movement path among web pages generated by a request of the at least one user who uses the web services.

The model generating unit may include a model generating module configured to collect the at least one event pattern, statistically analyze a flow of events corresponding to a behavior of the at least one user who uses the web services based on the collected event pattern, and generate an event model.

The event model may be generated to include the event pattern that is generated at a frequency higher than a preset access frequency threshold value.

The access frequency threshold value may be preset based on a frequency of an event flow that is generated at a relatively low frequency in the statistically analyzed event model.

The attack detecting unit may compare the event model with a flow of events received from the specific user terminal, and detect access of the web server by the specific user terminal as an attack when an event flow received from the specific user terminal is outside of a range of the event model.

The device may further include an access control unit configured to block the access of the web server by the specific user terminal when the access of the web server by the specific user terminal is detected as an attack.

The web page may be abstracted by representing a movement path such that a web page corresponding to an event generated in the at least one user terminal is provided based on a page identification address for identifying the web page.

In other example embodiments, a method of detecting a cyber attack is performed by a device for detecting a cyber attack of an information and communication system in which a web server managing a web page and at least one user terminal operated by at least one user who uses the web page are connected via a network. The method includes receiving an event generated in the at least one user terminal according to a behavior of at least one user who accesses the web server and uses web services provided from the web page; generating an event model by extracting an event pattern corresponding to a behavior of at least one user who uses the web services based on the received event; and detecting whether access of the web server by a specific user terminal is an attack by comparing the generated event model with an event received from the specific user terminal.

The method may further include blocking the access of the web server by the specific user terminal when access of the web server by the specific user terminal is detected as an attack.

BRIEF DESCRIPTION OF DRAWINGS

Example embodiments of the present invention will become more apparent by describing in detail example embodiments of the present invention with reference to the accompanying drawings, in which:

FIG. 7 is a flowchart illustrating a method of detecting whether access of a web server by a user terminal is an attack according to an embodiment of the present invention.

DESCRIPTION OF EXAMPLE EMBODIMENTS

Figure 1:
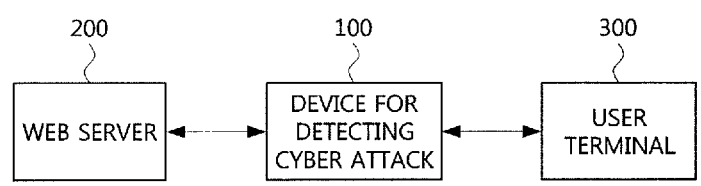
FIG. 1 is a diagram illustrating an exemplary environment in which a device for detecting a cyber attack and a method thereof according to an embodiment of the present invention are used.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a diagram illustrating an exemplary environment in which a device for detecting a cyber attack and a method thereof according to an embodiment of the present invention are used.

As illustrated in FIG. 1, the device for detecting a cyber attack and the method thereof may be respectively operated and performed in an information and communication system that is connected to a web server 200 managing web pages and at least one user terminal 300 operated by at least one user who uses web pages via a network.

Specifically, the device for detecting a cyber attack and the method thereof are provided between the web server 200 and the at least one user terminal 300, detect a cyber attack disguised as normal access from the user terminal 300, and may control access of the web server 200 by the user terminal 300 that has been detected as an attack.

In this case, the device for detecting a cyber attack and the method thereof may be provided in a server-client system including the web server 200 and the at least one user terminal 300, or may also be provided among the user terminals 300 of a peer-to-peer network (P2P) system in which the plurality of user terminals 300 are connected via a wired and/or wireless network. However, the present invention is not limited thereto but may be extended and applied to any communication system that requires information and communication among devices.

Here, the web server 200 stores web pages including multimedia information such as text, images, and videos on the Internet, and a plurality of web pages may be linked through hyperlinks and form web sites.

Therefore, when a hypertext transfer protocol (HTTP) request for receiving a web service from the user terminal 300 operated by a user who uses web sites is received in the web server 200, the web server 200 may provide a web service corresponding to the HTTP request to the user terminal 300.

The user terminal 300 may refer to an information processing device such as a server, a computer, a notebook, a smartphone, a tablet PC, and a PDA that includes an output device capable of outputting web sites and web pages provided from the web server 200 and an input device capable of requesting web services, is connected to the web server 200 or another user terminal 300 via a wired and/or wireless network, and can exchange information, but the present invention is not limited thereto.

Here, the device for detecting a cyber attack and the method thereof may be connected to the web server 200 and the at least one user terminal 300 via a wired and/or wireless network such as Universal Serial Bus (USB), Bluetooth, Wireless Fidelity (WiFi), 3Generation (3G), and Long Term Evolution (LTE).

Figure 2:
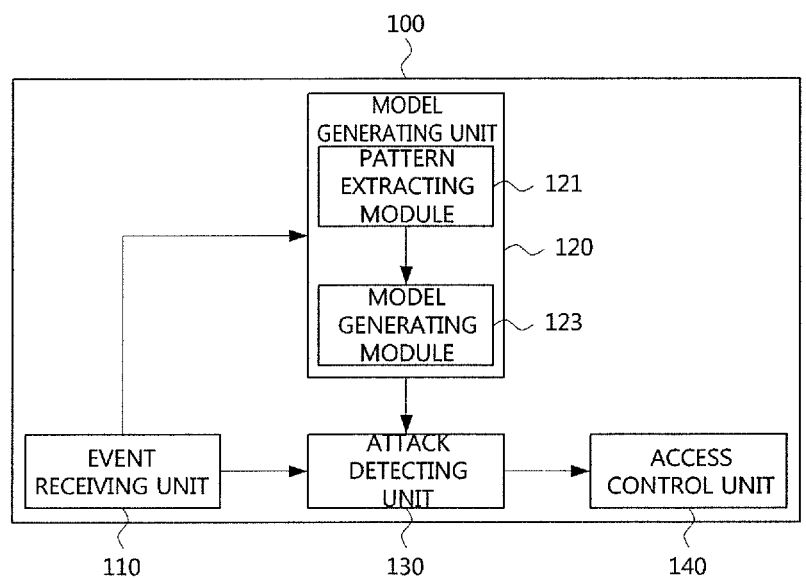
FIG. 2 is a block diagram illustrating a device for detecting a cyber attack according to an embodiment of the present invention.

FIG. 2 is a block diagram illustrating a device for detecting a cyber attack according to an embodiment of the present invention.

As illustrated in FIG. 2, a device for detecting a cyber attack 100 may include an event receiving unit 110, a model generating unit 120, and an attack detecting unit 130. Also, an access control unit 140 may be further included.

Here, the device for detecting a cyber attack 100 may be implemented by a communication device capable of receiving an event from the user terminal 300, a server including an information processing device for determining an event as a cyber attack, and an information processing device such as a computer, a notebook, a smartphone, a tablet PC, and a PDA.

The event receiving unit 110 may receive an event generated in the at least one user terminal 300 according to a behavior of at least one user who accesses the web server 200 and uses web services provided from web pages.

Here, the event may refer to a series of program operating commands that are generated by the user through the input device of the user terminal 300 in order to use web services provided from web pages.

For example, when the user who uses web pages provided from the web server 200 generates an event of clicking text represented as a hyperlink using a mouse of the user terminal 300, the user terminal 300 generates an HTTP request event for requesting a movement to a related web page, transmits the HTTP request event to the web server 200, and the web server 200 that has received the HTTP request event may perform a movement to the related web page.

In this case, the event receiving unit 110 receives the event generated in the user terminal 300. This is because recent cybercrimes have been intellectualized in the form of distributed denial of service (DDoS) attacks, spam sending, advanced persistent threat (APT) attacks by zombie PCs infected with malicious codes.

Therefore, all events introduced from the user terminal 300 to the web server 200 are received, and it is possible to monitor an attack on the web server 200 by the zombie PC that is disguised as normal access from the user who possesses an access right.

The model generating unit 120 may extract an event pattern corresponding to a behavior of at least one user who uses web services based on the event received from the event receiving unit 110 and generate an event model.

Here, the model generating unit 120 may include a pattern extracting module 121 and a model generating module 123.

The pattern extracting module 121 combines sequences of events received in the event receiving unit 110 along a movement path among web pages generated by a request of at least one user who uses web services, and may extract at least one event pattern.

For example, the user terminal 300 may generate an event of inputting an ID and a password for a login in a web page providing an e-mail service. After the login, an event of moving to a letter writing page according to the user's request is generated in an initial page provided from the web server 200, an event of inputting a message to be sent is generated in the letter writing page, and then an event of transmitting may be generated in the letter writing page.

Therefore, when events corresponding to a movement path among web pages by the behavior of the user who uses the e-mail service are combined according to a generation sequence, it is possible to extract an event pattern related to mail transfer.

In this manner, since the event pattern may be extracted by events corresponding to the behavior of the user who uses web services provided from web pages, it may be extracted in various forms according to the user's web service usage pattern.

The model generating module 123 collects at least one event pattern extracted by the pattern extracting module 121, statistically analyzes a flow of events corresponding to the behavior of least one user who uses web services based on the collected event pattern, and therefore may generate an event model.

Here, the event model may be generated by a clustering method of collecting similar event patterns or a density estimation method based on numerical statistics of the event pattern.

In particular, the event model may include an event pattern that is generated at a frequency higher than a preset access frequency threshold value. Here, the access frequency threshold value may be preset based on a frequency of an event flow that is generated at a relatively low frequency in the statistically analyzed event model.

The attack detecting unit 130 compares the event model generated by the model generating module 123 with an event from a specific user terminal 300 received by the event receiving unit 110, and may detect whether access of the web server 200 by the specific user terminal 300 is an attack.

Specifically, the attack detecting unit 130 compares the event model with a flow of the events received from the specific user terminal 300, and may detect the access of the web server 200 by the specific user terminal 300 as an attack when the event flow received from the specific user terminal 300 is outside of a range of the event model.

For example, when the event flow of the specific user terminal 300 is included in the event model, access of the web server 200 by the specific user terminal 300 may be detected as normal access.

On the other hand, when the event flow of the specific user terminal 300 is not included in or outside of a range of the event model, access of the web server 200 by the specific user terminal 300 may be detected as an attack.

The attack detecting unit 130 detects whether access of the web server 200 by the specific user terminal 300 is normal access or an attack, and then the access control unit 140 may control the access of the web server 200 by the specific user terminal 300 based on security policies.

Therefore, when the access of the web server 200 by the specific user terminal 300 is determined as the normal access, the access of the web server 200 by the specific user terminal 300 may be allowed.

On the other hand, when the access of the web server 200 by the specific user terminal 300 is detected as the attack, the access of the web server 200 by the specific user terminal 300 may be blocked.

Figure 3:
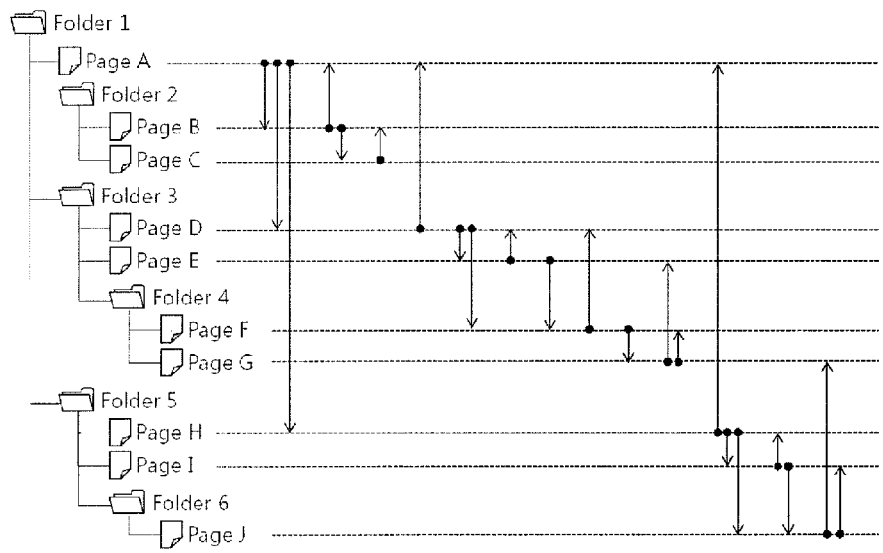
FIG. 3 is a diagram illustrating an exemplary structure of a web page according to an embodiment of the present invention.
Figure 4:
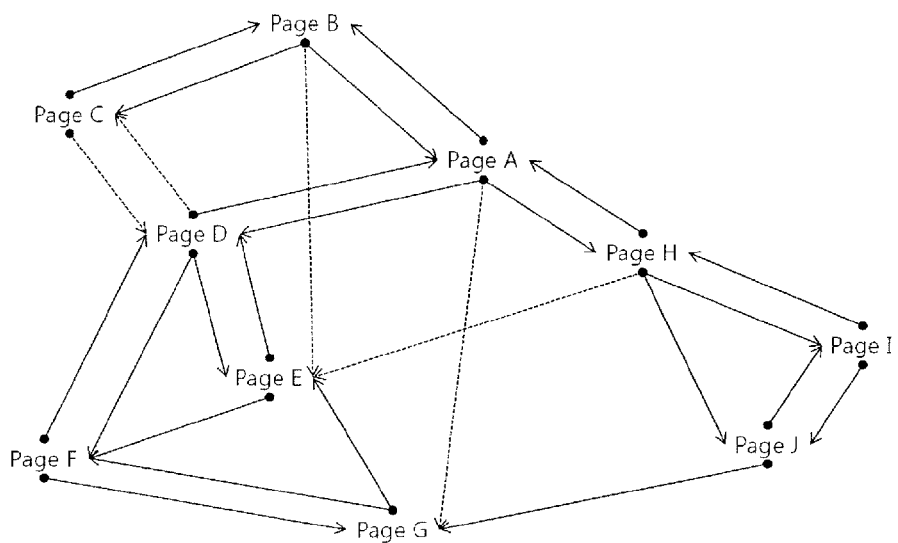
FIG. 4 is a diagram illustrating an exemplary flow of events corresponding to a user's behavior according to an embodiment of the present invention.

FIG. 3 is a diagram illustrating an exemplary structure of a web page according to an embodiment of the present invention. FIG. 4 is a diagram illustrating an exemplary flow of events corresponding to a user's behavior according to an embodiment of the present invention.

As illustrated in FIGS. 3 and 4, web pages may be linked to a plurality of different web pages on the Internet in addition to text, images, sounds, and images.

In particular, the web pages may be abstracted by representing a movement path such that the web page corresponding to the event generated in the user terminal is provided to the user based on a page identification address for identifying the web page.

More specifically, the web page may correspond to a uniform resource locator (URL) that can identify the web page. In this case, since the web page may be linked to a plurality of web pages on the Internet, URLs of the plurality of web pages linked to the web page may be dynamically allocated based on the URL of the web page.

That is, a URL parameter such as a keyword or an event of the web service provided from the plurality of web pages is additionally included at the end of the URL of the web page to correspond to each of the plurality of web pages linked to the web page.

In this manner, the web page corresponding to the event generated in the user terminal among the plurality of web pages linked to the web page may be provided to the user through the abstracted web page using a dynamic URL method.

For example, as illustrated in FIG. 3, Folder 1 may be formed in connection with Page A, Folder 2 including Page B and Page C, Folder 3 including Page D, Page E, and Folder 4, and Folder 5 including Page H, Page I, and Folder 6. In this case, Folder 4 may include Page F and Page G, and Folder 6 may include Page J.

Here, Pages A to J may refer to web pages including a plurality of web pages on the Internet in addition to multimedia information such as text, images, sounds, and images. Folders 1 to 6 may refer to web sites including a plurality of web pages such as Pages A to J, but the present invention is not limited thereto. Also, Pages A to J, and Folders 2 to 6 may be stored in a server other than the web server 200 in which Folder 1 is stored.

Folder 1 may be connected to Page A, Folder 2, Folder 3, and Folder 5 through hyperlinks. The hyperlink is a tag within content of the web page in which a text element linked to another web page is highlighted with an underline or expressed in a different color, and when a click event is input by the user, movement to a related web page may be performed.

Specifically for example, when Folder 1 is a web site providing an e-mail service, Page A, Folder 2, Folder 3, and Folder 5 connected to Folder 1 may refer to web pages that can perform at least one function of a function of displaying a received e-mail, a function of transmitting an e-mail, a function of checking whether the transmitted e-mail is received, and a function of displaying a deleted e-mail, but the present invention is not limited thereto.

Here, the device for detecting a cyber attack 100 may be positioned among Page A, Folder 2, Folder 3, and Folder 5 connected to Folder 1, monitor the event generated from the user in real time, and detect a cyber attack using the same.

The device for detecting a cyber attack 100 may combine events corresponding to a movement path among web pages by the user's behavior according to a generation sequence, and extract an event pattern according to a web service usage pattern.

Also, an event model may be generated by statistically analyzing a flow of events corresponding to the behavior of at least one user who uses web services based on the extracted event pattern.

Specifically, as illustrated in FIG. 4, a thick line arrow denotes a movable connection among web pages, and a dashed line arrow denotes an unmovable connection among web pages.

Here, the user who uses the web page generates an event using the user terminal 300 in order to request a movement among web pages, and the event generated at this time may refer to an HTTP request for requesting a movement of the web page from the web server 200 managing web pages, but the present invention is not limited thereto.

For example, an event of Page A accessing Page B and then moving to Page C is generated by the user who uses Page A, an event pattern may be extracted by combining events corresponding to a movement path among web pages by the user's behavior according to a generation sequence.

Therefore, the extracted event pattern is statistically analyzed, and when a flow of events of moving from Page A to Page C through Page B is generated at a frequency higher than a preset access frequency threshold value, this may be generated as an event model.

Therefore, when an event of moving from Page A to Page B or moving from Page B to Page C is generated by the specific user terminal 300, since the generated event flow is included in the event model, the device for detecting a cyber attack 100 determines the access as normal access and may allow the access of the web server 200 by the specific user terminal 300.

On the other hand, when the specific user terminal 300 generates an event of moving from Page A to Page E through Page B, or moving from Page A to Page C through Page B and then moving again to Page D, since the event flow is not included in the event model, the event is determined as an attack and the access of the web server 200 by the specific user terminal 300 may be blocked.

Figure 5:
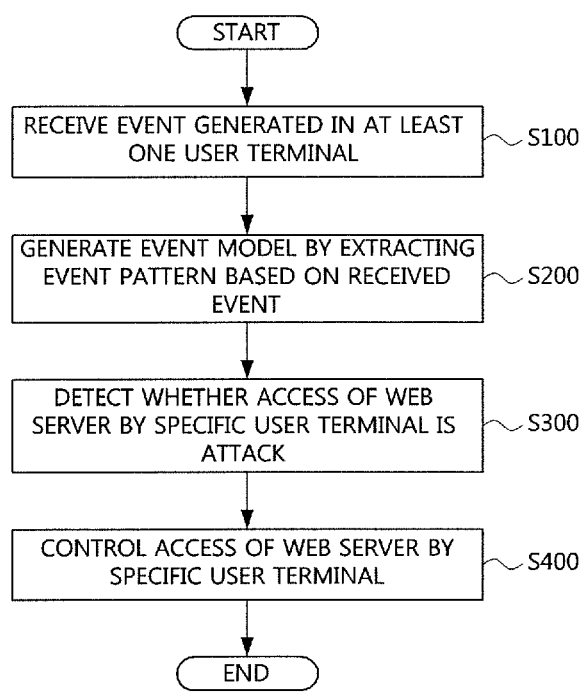
FIG. 5 is a flowchart illustrating a method of detecting a cyber attack according to an embodiment of the present invention.
Figure 6:
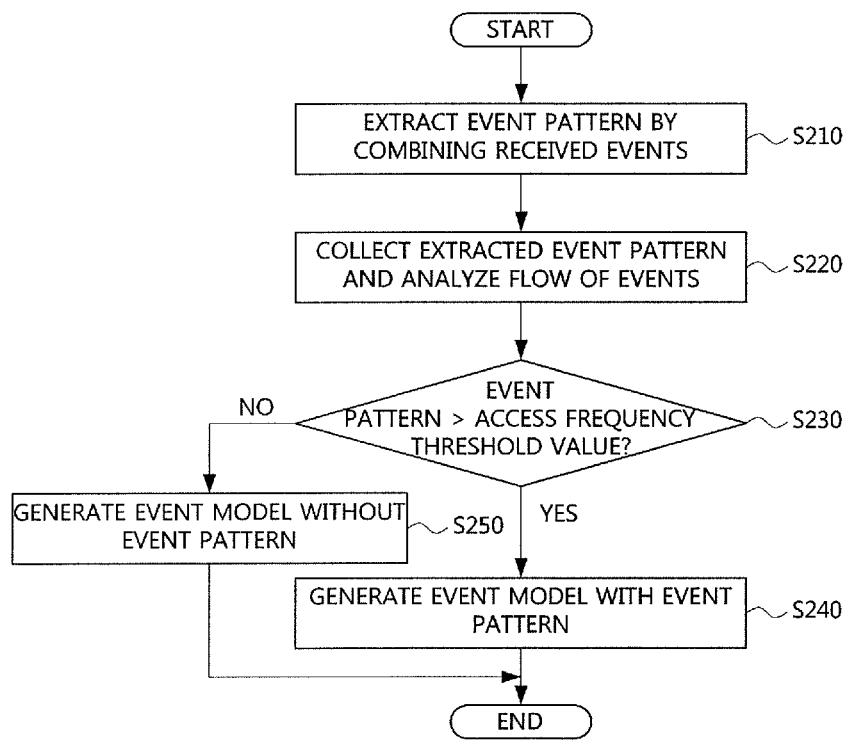
FIG. 6 is a flowchart illustrating operations of generating an event model according to an embodiment of the present invention.

FIG. 5 is a flowchart illustrating a method of detecting a cyber attack according to an embodiment of the present invention. FIG. 6 is a flowchart illustrating operations of generating an event model according to an embodiment of the present invention.

Also, FIG. 7 is a flowchart illustrating a method of detecting whether access of a web server by a user terminal is an attack according to an embodiment of the present invention.

As illustrated in FIGS. 5 to 7, the method of detecting a cyber attack may include receiving an event generated in at least one user terminal 300 (S100), generating an event model based on the received event (S200), and detecting whether access of the web server 200 by the specific user terminal 300 is an attack (S300). Also, the method may further include controlling access of the web server 200 by the specific user terminal 300 (S400) after the detecting of whether the access of the web server 200 by the specific user terminal 300 is an attack.

Here, the method of detecting a cyber attack may be performed by the device for detecting a cyber attack 100 of an information and communication system in which the web server 200 managing web pages and at least one user terminal 300 operated by at least one user who uses web pages are connected via a network.

The device for detecting a cyber attack 100 may be implemented by a communication device capable of receiving an event from the user terminal 300, a server including an information processing device for determining an event as a cyber attack, and an information processing device such as a computer, a notebook, a smartphone, a tablet PC, and a PDA.

An event generated in the at least one user terminal 300 may be received according to a behavior of at least one user who accesses the web server 200 and uses web services provided from web pages (S100).

Here, the event may refer to a series of program operating commands that are generated by the user through the input device of the user terminal 300 in order to use web services provided from web pages.

In this case, the event generated in the user terminal 300 is received. This is performed to respond to recent cybercrimes intellectualized in the form of distributed denial of service (DDoS) attacks, spam sending, advanced persistent threat (APT) attacks by zombie PCs infected with malicious codes.

That is, all events introduced from the user terminal 300 to the web server 200 are received, and it is possible to monitor an attack on the web server 200 by the zombie PC that is disguised as normal access from the user who possesses an access right.

Based on the received event, an event pattern corresponding to a behavior of at least one user who uses web services is extracted to generate an event model (S200).

More specifically, as illustrated in FIG. 6, in order to generate the event model, sequences of events received along a movement path among web pages generated by a request of at least one user who uses web services are combined and at least one event pattern may be extracted (S210). Here, the event pattern may be extracted in various forms according to the user's web service usage pattern.

Therefore, the extracted event pattern is collected, and a flow of events corresponding to a behavior of at least one user who uses web services may be statistically analyzed based on the collected event pattern (S220).

In this case, it is analyzed whether the event pattern is generated at a frequency higher than a preset access frequency threshold value (S230), and when the event pattern is generated at a frequency higher than the access frequency threshold value, the extracted event pattern may be included to generate the event model (S240).

On the other hand, when the event pattern is generated at a frequency lower than the access frequency threshold value, the extracted event pattern may be excluded when the event model is generated (S250).

Here, the access frequency threshold value may be preset based on a frequency of an event flow that is generated at a relatively low frequency in the event model that is generated by statistically analyzing events of users during a predetermined period.

The generated event model and the event received from the specific user terminal 300 are compared, and therefore it is possible to detect whether access of the web server 200 by the specific user terminal 300 is an attack (S300).

As illustrated in FIG. 7, in order to detect whether access of the web server 200 by the user terminal is an attack, a flow of events from a specific user terminal is received (S310), and the generated event model and the flow of events received from the specific user terminal may be compared (S320).

Therefore, it is checked whether the event flow of the specific user terminal 300 is included in the event model (S330), and when the event flow of the specific user terminal 300 is included in the event model, the access of the web server 200 by the specific user terminal 300 may be detected as normal access (S340).

On the other hand, when the event flow of the specific user terminal 300 is not included in or outside of a range of the event model, the access of the web server 200 by the specific user terminal 300 may be detected as an attack (S350).

In this manner, it is detected whether the access of the web server 200 by the specific user terminal 300 is normal access or an attack (S300), and then the access of the web server 200 by the specific user terminal 300 may be controlled based on security policies (S400).

That is, when the access of the web server 200 by the specific user terminal 300 is determined as the normal access, the access of the web server 200 by the specific user terminal 300 may be allowed.

On the other hand, when the access of the web server 200 by the specific user terminal 300 is detected as the attack, the access of the web server 200 by the specific user terminal 300 may be blocked.

In the above-described device for detecting a cyber attack and method thereof according to the embodiments of the present invention, events generated in the user terminal are monitored and analyzed in real time. Therefore, it is possible to rapidly and accurately detect various forms of cyber attacks.

Also, a load and time of systems that may be generated during detecting cyber attacks are minimized. Therefore, a speed of web services provided for the user is not influenced and it is possible to provide a security service having high availability and reliability.

In the above-described device for detecting a cyber attack and method thereof according to the embodiments of the present invention, events generated in the user terminal are monitored and analyzed in real time. Therefore, it is possible to rapidly and accurately detect various forms of cyber attacks.

Also, a load and time of systems that may be generated during detecting cyber attacks are minimized. Therefore, a speed of web services provided for the user is not influenced and it is possible to provide a security service having high availability and reliability.

While example embodiments of the present invention and their advantages have been described in detail, it should be understood that various changes, substitutions and alterations may be made to the example embodiments without departing from the scope of the invention as defined by the following claims.

What is claimed is:

1. A device for detecting a cyber attack in an information and communication system in which a web server managing a web page and at least one user terminal operated by at least one user who uses the web page are connected using a network, the device comprising:
   a processor; and
   a memory storing instruction configured to instruct the processor to perform;
   receiving events generated in the at least one user terminal according to a behavior of at least one user who accesses the web server and uses web services provided from the web page;
   assigning uniform resource locator (URL) dynamically to a first set of web pages accessed by a request of the at least one user and a second set of web pages connected to the first set of web pages through a hyperlink;

determining a movement path of the webpages corresponding to an order in which the event occurred among the first set of web pages and the second set of web pages based on the uniform resource locators;

extracting at least one event pattern by combining sequences of received events along the movement path;

generating an event model including the event pattern that is collected at a high frequency by collecting the at least one event pattern, and analyzing the collected event pattern statistically;

comparing the event model with a flow of events received from a specific user terminal;

detecting access of the web server by a specific user terminal as an attack in response to the determination that the flow of events received from the specific user terminal is outside of a range of the event model; and blocking the access of the web server by the specific user terminal in response to the determination that access of the web server by the specific user terminal is detected as an attack, wherein the events are a series of program operating commands that are generated through an input device of the user terminal, and wherein the assigning uniform resource locator comprises adding a keyword for the web services or a parameter indicating the events to uniform resource locators of the first set of web pages and the second set of web pages.

2. The device of claim 1,
wherein the analyzing the collected event pattern statistically is performed by one of a clustering method and a density estimation method.

3. A method of detecting a cyber attack that is performed by a device for detecting the cyber attack of an information and communication system in which a web server managing a web page and at least one user terminal operated by at least one user who uses the web page are connected using a network, the method comprising:

receiving events generated in the at least one user terminal according to a behavior of at least one user who accesses the web server and uses web services provided from the web page;

assigning uniform resource locator (URL) dynamically to a first set of web pages accessed by a request of the at least one user and second set of web pages connected to the first set of web webpages through a hyperlink;

determining a movement path of the web pages corresponding to the event among the first set of web pages and the second set of web pages based on the uniform resource locators;

extracting at least one event pattern by combining sequences of received events along a the movement path;

generating an event model including the event pattern by collecting the at least one event pattern and analyzing the collected event pattern statistically;

comparing the generated event model with a flow of events received from a specific user terminal;

detecting access of the web server by a specific user terminal as an attack in response to the determination that the flow of events received from the specific user terminal is outside of a range of the event model; and blocking the access of the web server by the specific user terminal in response to the determination that access of the web server by the specific user terminal is detected as an attack, wherein the events are a series of program operating commands that are generated through an input device of the user terminal; and wherein the accessing uniform resource locator comprises adding a keyword for the web services or a parameter indicating the events to uniform resource locators of the first set of web pages and the second set of web pages.

4. The method of claim 3,
wherein the analyzing the collected event pattern statistically is performed by one of a clustering method and a density estimation method.

* * * * *